June 12, 1928.
B. H. LEESON
1,673,254
BALANCED ELECTRIC PROTECTIVE ARRANGEMENT FOR ALTERNATING
CURRENT SYSTEMS AND RELAYS THEREFOR
Filed Sept. 20, 1924
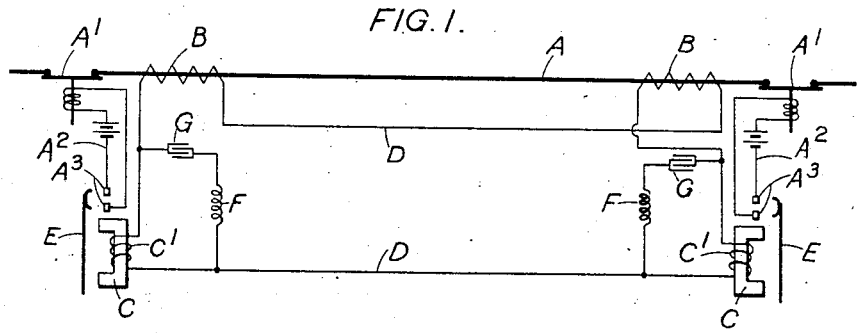
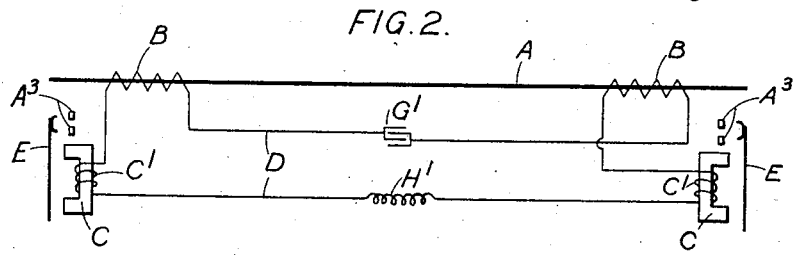
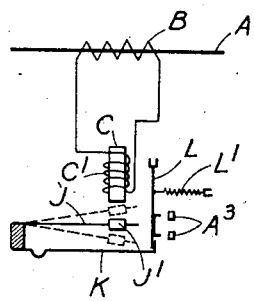
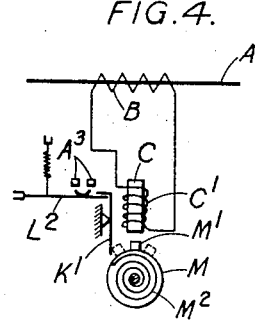
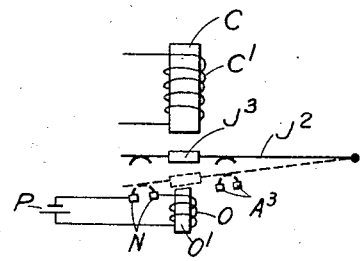

Patented June 12, 1928.

1,673,254

UNITED STATES PATENT OFFICE.

BRUCE HAMER LEESON, OF TYNEMOUTH, ENGLAND, ASSIGNOR TO A. REYROLLE & COMPANY LIMITED, OF HEBBURN-ON-TYNE, ENGLAND, A BRITISH COMPANY.

BALANCED ELECTRIC PROTECTIVE ARRANGEMENT FOR ALTERNATING-CURRENT SYSTEMS AND RELAYS THEREFOR.

Application filed September 20, 1924, Serial No. 738,961, and in Great Britain October 16, 1923.

This invention relates to balanced electric protective arrangements, for example of the Merz-Price type for alternating current systems and relays therefor.

Such protective arrangements depend for their operation on the assumption that the currents entering and leaving the protected section at its ends are equal to one another. These currents are caused to pass through the primaries of transformers disposed one at each end of the protected section, the secondaries of these transformers being normally balanced against one another in a pilot circuit containing relays which act to cut out the section when a fault occurs. It has been found impossible to obtain a perfect balance on the secondary system throughout the whole range of load and to provide for conditions such as are brought about for example by the occurrence of a fault external to the system and the sensitiveness of the relay has thus been determined by such factors as the accuracy of the balance of the transformers and the out-of-balance capacity currents existing in the pilots. To prevent the undesired operation of the relays as a result of the out-of-balance effect in the pilot circuit due to these causes, various suggestions have been made but all these suggestions have been based on the assumption that the primary currents are equal or very nearly equal at the two ends of the protected section and are at normal frequency.

It has now been found that under certain conditions the primary currents at the two ends of a section do not conform to this assumption of equality and are neither equal nor at normal frequency during a sustained external fault. For instance, during an arc fault either between phases or to earth external to the protected section, it is possible for the current leaving one end of the section to be far in excess of that entering at the other end of the section. This excess or difference current has a high frequency corresponding to the natural period of oscillation of the protected section or of the whole system and is often sufficient to cause the undesired operation of the relays. This effect is due to capacity and inductance phenomena and very heavy currents at high frequencies may occur. A similar effect may also be produced irrespective of the supply of power through the section as a result of the stored electrostatic energy in the system.

It is possible to obviate this disadvantage to some extent by employing a relay having a shunting resistance across its terminals, such relay being known and acting on the principle of providing an alternative path for the high frequency currents. This, however, only renders the relay immune from tripping at a given frequency provided the current is below a critical value. Currents above that value will operate the relay. Further the shunting resistance impairs the sensitiveness of the relay to a greater or less extent at any value of the frequency.

According to the present invention a relay is employed which is tuned so as to be responsive only to a predetermined range of current and frequency and is insensitive, that is, does not operate the tripping circuit, at other currents and frequencies. The protective system is thus immune from undesired effects due to high frequency disturbances, for the relay will have its setting or sensitiveness governed or determined by the current characteristics in the protected cables at normal frequency.

This tuning of the relay may be effected in various ways for example electrically or mechanically.

When tuned electrically the operating coil of the relay may be provided with an inductance and a capacity in its circuit so arranged that resonance is obtained only when currents at the predetermined normal line frequency, say for example 50 periods or within say a range of 45 to 55 periods.

Again the whole of the pilot system may be similarly tuned by the insertion in it of the desired inductance and capacity.

When the tuning is accomplished mechanically some device having a natural period of vibration suitable for the normal frequency range of the protective system is employed in combination with the operating coil or electromagnet of the relay.

This mechanical device may be in the nature of a vibratory reed carrying a small body of magnetic material in the field of the relay electromagnet and so arranged that when the amplitude of its vibrations is sufficiently increased owing to the action of currents and frequencies within the predetermined range, it acts to close the tripping circuit. This may be done for instance by providing in the path of vibration of the reed, some form of catch which normally keeps the tripping circuit open but is moved to allow that circuit to close when the reed vibrations are of the necessary amplitude.

Instead of the reed some suitable form of spring-controlled pendulum or balance wheel may be employed acting in an analogous manner.

In some cases the reed or other vibrating member may, when its amplitude of vibration is sufficiently increased, bring the small body of magnetic material which it carries, within the field of another electromagnet which will then hold it stationary to complete the tripping circuit. This field may be produced by a permanent magnet or electromagnet and if desired, the circuit of the latter may be affected by the large amplitude movement of the vibrating member.

The improved relays according to this invention may be provided with some means by which they may be given an inverse time delay action, that is to say in addition to the features of construction above mentioned for rendering them immune from high frequency disturbances, their construction may be such as to render them comparatively slow in action for lighter out-of-balance currents in the system.

In the accompanying drawings which are diagrams illustrating by way of example various ways in which the invention may be carried out, Figure 1 shows a portion of a balanced protective system in which each relay is tuned, Figure 2 shows a similar section in which the pilot circuit containing the relays is tuned, Figure 3 illustrates one method of tuning the relay mechanically, Figure 4 illustrates another method of tuning the relay mechanically, and Figure 5 shows one way in which a holding electromagnet may be employed in conjunction with a relay of the kind shown in Figure 3.

In Figures 1, 2, 3 and 4 A represents one of the main conductors to be protected, for instance one conductor of a three-phase feeder. At each end of the protected conductor there is a circuit-breaker A' which is opened when a tripping circuit $A^2$ is completed by closing a gap at the contacts $A^3$. The circuit-breakers and tripping circuits are only shown in Figure 1 and they are given merely by way of example. At each end of the protected conductor A a current transformer is arranged in a wellknown manner, the secondary circuit B of each of these transformers being connected to relays C having operating coils C' contained in a pilot circuit D. In Figures 1 and 2 each of these relays is shown diagrammatically as having an armature E carrying contacts which when the relay is operated close the contacts $A^3$ in the appropriate tripping circuit.

In the example shown in Figure 1 the circuit of each relay is tuned so as to be responsive only to a predetermined range of current and frequency by introducing an inductance F and a capacity G and thus the high frequency disturbances previously mentioned will not have the effect of operating the relays.

In practice it is found that the arrangement as shown in Figure 1 is effective if the inductance of $C^1$ is high in relation to that of F. Ratios of from 10 to 1 to 100 to 1 may be mentioned as having been used with success.

In the arrangement shown in Figure 2 the same effect is obtained by introducing the proper capacity G' and inductance H' into the pilot circuit D as a whole.

Figure 3 shows by way of example one way in which the relay may be tuned mechanically. This is done by providing it with a vibratory member such as a spring or reed J having a small armature or body of magnetic material J' mounted upon it so that when the reed J vibrates the magnetic body J' moves in the field of the relay electromagnet.

The loaded reed J J' is so constructed that it has a natural period of vibration corresponding to the normal frequency of the currents in the protected system and thus when currents of that frequency pass through the relay winding C' the reed will be set in vibration and those vibrations will be of large amplitude when the currents at that normal frequency exceed the proper limit.

When these large amplitude vibrations are produced the reed strikes a light catch or retaining member K and releases a contact-carrying member or arm L which then under the action of a spring L' closes the contacts $A^3$ of the tripping circuit.

The relay will be immune from disturbances due to currents and frequencies outside the normal range because such currents will not produce the large amplitude vibration necessary to release the catch K and contact arm L.

The relay shown diagrammatically in Figure 4 works on the same principle but instead of the vibrating reed J a light balance wheel M is provided bearing a small mass of magnetic material M' in the magnetic field of the relay. The balance wheel is controlled by a spring $M^2$ and the amplitude of its oscillation will depend upon the correspondence between the frequency of the current in the relay coil C' and the natural period of oscillation of the balance wheel.

When the amplitude of oscillation is sufficient a catch K' is moved releasing a spring-controlled contact-making arm L² in a manner similar to that described with reference to Figure 3.

Figure 5 illustrates one way in which a holding electromagnet may be employed in conjunction for instance with a vibrating reed of the kind shown in Figure 3. When the amplitude of vibration of the member J² J³ in Figure 5 is sufficiently great it completes a circuit at contacts N such circuit comprising the coil O of an electromagnet O' and a battery P. The energizing of the coil O creates a magnetic field which holds the magnetic body J³ in the position shown in broken lines and in that position the tripping circuit is completed at the contacts A³.

It is to be understood that these constructions are merely described by way of example and that the invention may be carried out in other ways coming within the scope of the claims.

What I claim as my invention and desire to secure by Letters Patent is:—

1. The combination with a balanced electric protective system for alternating current power lines operating at a normal frequency, of a pilot circuit, relays in said pilot circuit, tripping circuit contacts controlled by the relays and means for rendering said relays immune from the effects of high frequency currents having frequencies outside the normal range of frequency of the power currents.

2. The combination with a balanced electric protective system of a pilot circuit, relays in said pilot circuit, tripping circuit contacts controlled by the relays, and means for rendering said relays responsive to currents at frequencies corresponding to those of the normal power currents in the protected circuit and immune from the effects of high frequency currents flowing in the power circuit.

3. In a balanced electric protective system the combination of a feeder or other conductor to be protected, circuit-breakers at each end of said conductor, a current transformer at each end of said conductor, a pilot circuit connecting the secondary windings of said current transformers, relays in said pilot circuit, tripping circuits for the circuit-breakers, contacts in said tripping circuits controlled by said relays and means for tuning said relays so that they respond only to a predetermined range of current and frequency and are insensitive to high frequency disturbances.

4. The combination with a balanced electric protective system, of a pilot circuit, relays in said pilot circuit, tripping circuit contacts controlled by the relays and a vibratory contact-controlling member forming part of each relay, the natural period of vibration of said member being such that the large amplitude of movement necessary for closing the circuit controlled by the relay is only produced by currents and frequencies within a predetermined range and corresponding to that of the normal power currents in the protected circuit.

5. The combination with a balanced electric protective system, of a pilot circuit, relays in said pilot circuit, a tripping circuit contact-closing member in each of said relays, a catch or retaining device for said contact-closing member and a vibratory member in each relay controlling said catch, the natural period of vibration of such vibratory member being such that the large amplitude of movement necessary for releasing the catch is only produced by currents and frequencies within a predetermined range and corresponding to that of the normal power currents in the protected circuit.

6. In a balanced electric protective system the combination of a feeder or other conductor to be protected, circuit-breakers at each end of said conductor, a current transformer at each end of said conductor, a pilot circuit connecting the secondary windings of said current transformers, relays in said pilot circuit, a vibratory member in each of said relays the natural period of vibration of said vibratory member being such that a large amplitude movement is only produced by currents and frequencies within a predetermined range and corresponding to that of the normal power currents in the protected circuit, tripping circuits for the circuit-breakers, contact-closing members for the tripping circuits and catches or retaining devices for the contact-closing members such catches being released by a large amplitude movement of the vibratory members.

7. The combination with a conductor supplying alternating current, of a balanced electric protective system comprising a current transformer at each end of the conductor, a pilot circuit connecting the secondary windings of said transformers, relays in said pilot circuit, tripping circuits controlled by the relays, and means for rendering such relays responsive only to currents at frequencies corresponding to those of the currents in the protected conductor under normal conditions.

In testimony whereof I have signed my name to this specification.

BRUCE HAMER LEESON.